(12) United States Patent
Kitayama et al.

(10) Patent No.: US 11,019,285 B2
(45) Date of Patent: May 25, 2021

(54) CALIBRATION METHOD OF INFRARED CAMERA AND CALIBRATION SYSTEM OF INFRARED CAMERA

(71) Applicant: Tokyo Electron Limited, Tokyo (JP)

(72) Inventors: Tomohisa Kitayama, Miyagi (JP); Takashi Kubo, Miyagi (JP); Takari Yamamoto, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 16/697,631

(22) Filed: Nov. 27, 2019

(65) Prior Publication Data

US 2020/0177825 A1    Jun. 4, 2020

(30) Foreign Application Priority Data

Nov. 29, 2018 (JP) .............................. JP2018-222968
Oct. 29, 2019 (JP) .............................. JP2019-196695

(51) Int. Cl.
| | |
|---|---|
| *H04N 5/33* | (2006.01) |
| *H04N 17/00* | (2006.01) |
| *G01J 5/00* | (2006.01) |
| *G01J 5/02* | (2006.01) |
| *G01J 5/52* | (2006.01) |

(52) U.S. Cl.
CPC ................. *H04N 5/33* (2013.01); *G01J 5/00* (2013.01); *G01J 5/02* (2013.01); *G01J 5/522* (2013.01); *H04N 17/002* (2013.01); *G01J 2005/0048* (2013.01); *G01J 2005/0077* (2013.01)

(58) Field of Classification Search
CPC ...... G01J 5/00; G01J 5/02; G01J 5/522; G01J 2005/0048; G01J 2005/0077; H04N 5/33; H04N 17/002
See application file for complete search history.

(56) References Cited

U.S. PATENT DOCUMENTS

| | | | |
|---|---|---|---|
| 2016/0334284 A1* | 11/2016 | Kaplun Mucharrafille | ................ G01K 15/00 |
| 2016/0349228 A1* | 12/2016 | Kester | ...................... G01J 3/36 |
| 2017/0372928 A1* | 12/2017 | Yamada | ............ H01L 21/67248 |

FOREIGN PATENT DOCUMENTS

JP        2017-228230 A      12/2017

* cited by examiner

*Primary Examiner* — Mark R Gaworecki
(74) *Attorney, Agent, or Firm* — Pearne & Gordon LLP

(57) ABSTRACT

A calibration method of an infrared camera includes setting a placing table on which a substrate is placed to different temperatures and acquiring a measurement value of radiation amount of infrared light emitted from each of multiple zones provided in a top surface of the placing table by an infrared camera at each of the temperatures; calculating, as a calibration value, a difference between a measurement value of a reference zone which is one of the zones provided with a temperature sensor and a measurement value of another one of the zones at each of the temperatures; specifying an interpolation curve indicating a variation tendency of the calibration value with respect to the measurement value of the reference zone for each of the zones; and storing parameters of the interpolation curve specified for each of the zones.

10 Claims, 15 Drawing Sheets

FIG. 7

| DIVISION ZONE ID | COEFFICIENT OF INTERPOLATION CURVE | | |
|---|---|---|---|
| | a | b | c |
| DZ-A11 | 0.12 | 0.02 | 0.03 |
| DZ-A12 | 0.11 | 0.03 | 0.02 |
| DZ-A13 | 0.10 | 0.01 | 0.04 |
| ⋮ | ⋮ | ⋮ | ⋮ |

CALIBRATION METHOD OF INFRARED CAMERA AND CALIBRATION SYSTEM OF INFRARED CAMERA

CROSS-REFERENCE TO RELATED APPLICATION

This application claims the benefit of Japanese Patent Application Nos. 2018-222968 and 2019-196695 filed on Nov. 29, 2018 and Oct. 29, 2019, respectively, the entire disclosures of which are incorporated herein by reference.

TECHNICAL FIELD

The embodiments described herein pertain generally to a calibration method of an infrared camera and a calibration system of the infrared camera.

BACKGROUND

For example, Patent Document 1 describes a method in which an electrostatic chuck is set to different temperatures and resistance values of heaters embedded in respective division regions of the electrostatic chuck are measured at the respective temperatures to create a conversion table that indicates a relationship between the resistance value and the temperature. The temperature of the electrostatic chuck is measured using an infrared (IR) camera. The temperatures of the respective division regions of the electrostatic chuck can be estimated from the resistance values of the heaters embedded in the respective division regions with reference to the created conversion table.

Patent Document 1: Japanese Patent Laid-open Publication No. 2017-228230

SUMMARY

In one exemplary embodiment, a calibration method of an infrared camera includes setting a placing table on which a substrate is placed to different temperatures and acquiring a measurement value of radiation amount of infrared light emitted from each of multiple zones provided in a top surface of the placing table by an infrared camera at each of the temperatures; calculating, as a calibration value, a difference between a measurement value of a reference zone which is one of the zones provided with a temperature sensor and a measurement value of another one of the zones at each of the temperatures; specifying an interpolation curve indicating a variation tendency of the calibration value with respect to the measurement value of the reference zone for each of the zones; and storing parameters of the interpolation curve specified for each of the zones.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 7 is a schematic cross-sectional view illustrating an example of a configuration of the processing apparatus when the conversion table is created in the first exemplary embodiment;

DETAILED DESCRIPTION

Figure 1:
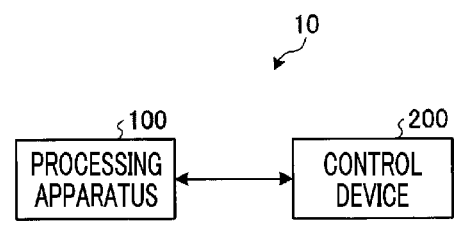
FIG. 1 is a system configuration view illustrating an example of a processing system according to an exemplary embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

The following embodiments are examples for describing the present disclosure, and the present disclosure is not limited thereto. In the following description, same parts or parts having same function will be assigned same reference numerals, and redundant description will be omitted.

Hereinafter, exemplary embodiments of a calibration method of an infrared camera and a calibration system of the infrared camera according to the present disclosure will be described in detail with reference to the accompanying drawings. However, it should be noted that the calibration method of the infrared camera and the calibration system of the infrared camera of the present disclosure are not limited to the exemplary embodiments described herein.

Temperature measurement values measured by an IR camera vary depending on a temperature change or an aging of the IR camera itself. Further, there exists a device difference in the measurement value of the temperature between different IR cameras. If the temperatures measured by the IR camera are not uniform, the accuracy of a conversion table that indicates a corresponding relationship between resistance values and temperatures of a heater is degraded. Therefore, the accuracy in the temperatures of respective division regions of an electrostatic chuck which are estimated from the resistance values of the heaters embedded in the respective division regions is degraded.

Accordingly, the present disclosure provides a technology capable of improving the temperature measurement accuracy of an IR camera.

First Exemplary Embodiment

[Configuration of Processing System 10]

FIG. 1 is a system configuration view illustrating an example of a processing system 10 according to an exemplary embodiment. As illustrated in FIG. 1, the processing system 10 includes, e.g., a processing apparatus 100 and a control device 200. The processing apparatus 100 performs an etching on a substrate such as a semiconductor wafer by using plasma. The control device 200 controls components of the processing apparatus 100 and causes the processing apparatus 100 to execute a predetermined processing on the substrate carried into the processing apparatus 100.

[Configuration of Processing Apparatus 100]

Figure 2:
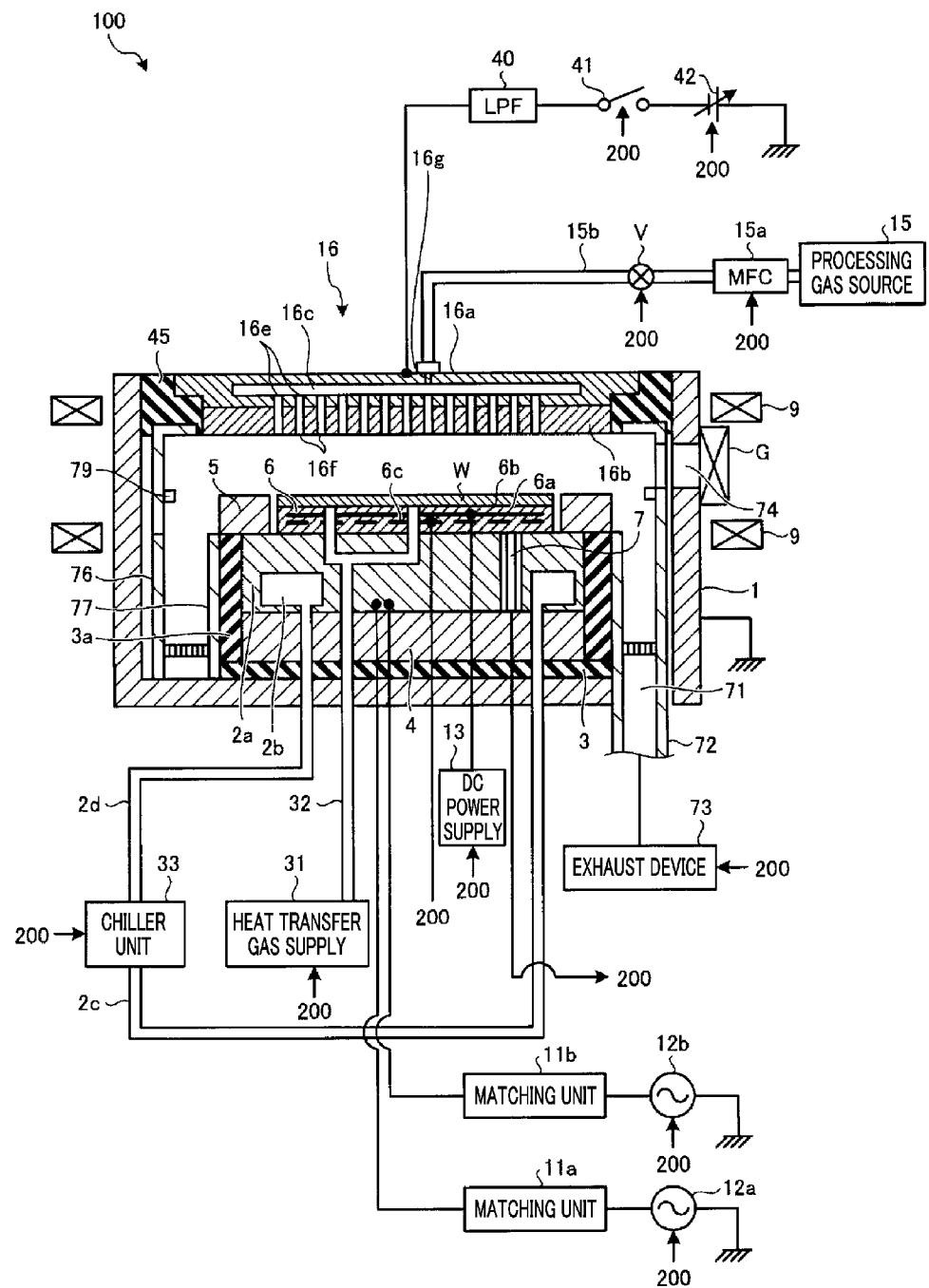
FIG. 2 is a schematic cross-sectional view illustrating an example of a configuration of a processing apparatus according to a first exemplary embodiment.

FIG. 2 is a schematic cross-sectional view illustrating an example of a configuration of a processing apparatus 100 according to a first exemplary embodiment. The processing apparatus 100 includes, e.g., a chamber 1 hermetically configured as illustrated in FIG. 2. The chamber 1 is formed of, e.g., aluminum having an anodically oxidized surface and has a substantially cylindrical shape. The chamber 1 is electrically grounded.

A base 2a made of a conductive metal such as aluminum is provided within the chamber 1. The base 2a serves as a lower electrode. The base 2a is supported by a conductor supporting table 4 provided on an insulating plate 3. An edge ring 5 made of, e.g., single crystalline silicon is provided on the upper outer periphery of the base 2a. The edge ring 5 may also be referred to as a focus ring. Around the base 2a and the supporting table 4, a cylindrical inner wall member 3a made of, e.g., quartz, is provided to surround the base 2a and the supporting table 4.

A shower head 16 serving as an upper electrode is provided above the base 2a to face the base 2a substantially in parallel, i.e., to face a substrate W placed on the base 2a. The shower head 16 and the base 2a serve as a pair of electrodes (an upper electrode and a lower electrode). A high frequency power supply 12a is connected to the base 2a through a matching unit 11a. A high frequency power supply 12b is also connected to the base 2a through a matching unit 11b.

The high frequency power supply 12a is configured to supply the base 2a with a high frequency power of a predetermined frequency (e.g., 100 MHz) for plasma formation. Also, the high frequency power supply 12b is configured to supply the base 2a with a high frequency power of a predetermined frequency for ion attraction (bias), i.e., a frequency (e.g., 13 MHz) lower than that of the high frequency power supply 12a. The ON/OFF operations of the high frequency power supplies 12a and 12b and the high frequency powers supplied by the high frequency power supplies 12a and 12b are controlled by the control device 200.

An electrostatic chuck 6 is provided on a top surface of the base 2a to attract and hold the substrate W and to heat the substrate W. The electrostatic chuck 6 includes an insulator 6b, an electrode 6a and multiple heaters 6c embedded within the insulator 6b. The electrode 6a is connected to a DC power supply 13. The heaters 6c are connected to the control device 200. The electrostatic chuck 6 is configured to generate a Coulomb force on a surface of the electrostatic chuck 6 by a DC voltage applied from the DC power supply 13, and is configured to attract and hold the substrate W on a top surface of the electrostatic chuck 6 by the Coulomb force. The ON/OFF operation of the DC power supply 13 is controlled by the control device 200.

The electrostatic chuck 6 is configured to heat the substrate W with the heaters 6c heated by the electric power supplied from the control device 200. The top surface of the electrostatic chuck 6 is divided into multiple areas, and each area is further divided into multiple zones. One heater 6c is provided in each of the zones. The electrostatic chuck 6 and the base 2a are examples of a placing table, and the top surface of the electrostatic chuck 6 is an example of a top surface of the placing table.

Further, multiple protrusions are formed on the top surface of the electrostatic chuck 6, and the substrate W is supported by the multiple protrusions. A heat transfer gas to be described later is supplied between the multiple protrusions.

Within the base 2a below each area of the electrostatic chuck 6, a temperature sensor 7 configured to measure the temperature of the electrostatic chuck 6 in the corresponding area is provided. In the present exemplary embodiment, the temperature sensor 7 is, e.g., a fluorescent optical fiber thermometer. The temperature sensor 7 measures the temperature of the electrostatic chuck 6 from below the electrostatic chuck 6 and outputs the measured temperature to the control device 200.

A flow path 2b through which a heat transfer medium flows is formed within the base 2a, and a chiller unit 33 configured to control a temperature of the heat transfer medium is connected to the flow path 2b through pipes 2c and 2d. While the heat transfer medium supplied from the chiller unit 33 circulates through an inside of the flow path 2b, the temperature of the base 2a is controlled by heat exchange with the heat transfer medium. The temperature of the heat transfer medium supplied by the chiller unit 33 is controlled by the control device 200.

In the base 2a, a pipe 32 is provided through the base 2a to supply a heat transfer gas (a backside gas) such as a helium gas between the electrostatic chuck 6 and the substrate W. The pipe 32 is connected to a heat transfer gas supply 31. A pressure of the heat transfer gas supplied between the electrostatic chuck 6 and substrate W from the heat transfer gas supply 31 through the pipe 32 is controlled by the control device 200.

Since the temperature of the heat transfer medium flowing through the flow path 2b, the electric power supplied to each of the heaters 6c within the electrostatic chuck 6, and the pressure of the heat transfer gas supplied between the electrostatic chuck 6 and the substrate W are controlled, the temperature of the substrate W on the electrostatic chuck 6 can be controlled to a temperature within a predetermined range.

The shower head 16 is provided at a top portion of the chamber 1. The shower head 16 includes a body 16a and an upper ceiling plate 16b, and supported at the top portion of the chamber 1 with an insulating member 45 therebetween. The body 16a is made of, e.g., aluminum having an anodically oxidized surface and detachably supports the upper ceiling plate 16b at a bottom thereof. The upper ceiling plate 16b is made of, e.g., a silicon-containing material such as quartz.

A gas diffusion space 16c is provided within the body 16a. Multiple gas outlet openings 16e are formed at the bottom of the body 16a to be located under the gas diffusion space 16c. Multiple gas discharge holes 16f are formed in the upper ceiling plate 16b to penetrate through the upper ceiling plate 16b in the thickness direction thereof, and the gas discharge holes 16f communicate with the above-described gas outlet openings 16e, respectively. Through this configuration, a processing gas supplied into the gas diffusion space 16c is diffused in the gas diffusion space 16c to be supplied into the chamber 1 through each of the gas outlet openings 16e and the gas discharge holes 16f in a shower form. A temperature controller such as a non-illustrated heater or a non-illustrated pipe configured to circulate the heat transfer medium is provided in the body 16a to control a temperature of the shower head 16 within a desired range during the processing onto the substrate W.

A gas inlet port 16g is formed at the body 16a to introduce the processing gas into the gas diffusion space 16c. The gas inlet port 16g is connected, through a pipe 15b, to a processing gas source 15 configured to supply the processing gas for the processing onto the substrate W. The pipe 15b is equipped with a valve V and a mass flow controller (MFC) 15a. The processing gas supplied from the processing gas source 15 is supplied into the gas diffusion space 16c of the shower head 16 through the pipe 15b and then supplied into the chamber 1 through each of the gas outlet openings 16e and the gas discharge holes 16f. The valve V and the MFC 15a are controlled by the control device 200.

A variable DC power supply 42 is electrically connected to the shower head 16 via a low pass filter (LPF) 40 and a switch 41. The switch 41 controls the supply or the stop of the supply of a DC voltage from the variable DC power supply 42 to the shower head 16. The current and the voltage of the variable DC power supply 42 and the ON/OFF operation of the switch 41 are controlled by the control device 200. For example, when the high frequency powers are supplied from the high frequency power supplies 12a and 12b to the base 2a and the plasma is formed within the chamber 1, the switch 41 is turned ON by the control device 200 as necessary so that the DC voltage of a predetermined magnitude is applied to the shower head 16.

An exhaust port 71 is formed at the bottom of the chamber 1. An exhaust device 73 is connected to the exhaust port 71 through an exhaust pipe 72. The exhaust device 73 includes a vacuum pump and is configured to decompress the inside of the chamber 1 to a predetermined vacuum degree by operating the vacuum pump. An exhaust flow rate of the exhaust device 73 is controlled by the control device 200. An opening 74 is formed at a side wall of the chamber 1 to carry in and out the substrate W, and a gate valve G for opening and closing the opening 74 is provided at the opening 74.

A deposition shield 76 is detachably provided along an inner wall surface, on an inner wall of the chamber 1. Further, a deposition shield 77 is provided on an outer circumference surface of the inner wall member 3a to cover the inner wall member 3a. The deposition shields 76 and 77 suppress etching by-products (deposits) from being deposited on the inner wall of the chamber 1. Further, a conductive member (GND block) 79 connected to the ground in a DC manner is provided at a position of the deposition shield 76 having substantially the same height as the substrate W attracted and held on the electrostatic chuck 6. An abnormal discharge in the chamber 1 is suppressed by the conductive member 79.

A ring magnet 9 is concentrically placed around the chamber 1. The ring magnet 9 forms a magnetic field in a space between the shower head 16 and the base 2a. The ring magnet 9 is rotatably held by a non-illustrated rotation mechanism.

[Division of Areas of Electrostatic Chuck 6]

Figure 3:
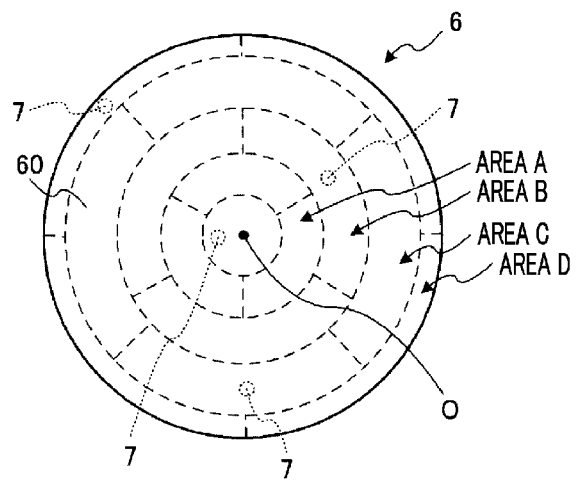
FIG. 3 is a view illustrating an example of dividing areas of an electrostatic chuck.

FIG. 3 is a view illustrating an example of dividing areas of the electrostatic chuck 6. For example, as shown in FIG. 3, the top surface of the electrostatic chuck 6 is concentrically divided into multiple areas around a center position O of the electrostatic chuck 6. Hereinafter, an area including the center position O and an area adjacent thereto will be described as "area A" and an area adjacent to the area A will be described as "area B." Also, an area adjacent to the area B will be described as "area C" and the outermost area will be described as "area D". One temperature sensor 7 is provided in each of the areas.

Further, each of the areas is divided into multiple zones 60 in the circumferential direction of a circle around the center position O. In the example shown in FIG. 3, the area adjacent to the area including the center position O in the area A is divided into three zones 60 and the area B is divided into three zones 60. Also, each of the area C and the area D is divided into four zones 60. Furthermore, a method of dividing the areas of the electrostatic chuck 6 is not limited to the example illustrated in FIG. 3.

One heater 6c is provided in the corresponding one of the zones 60 within the electrostatic chuck 6. Electric power to be supplied to the heater 6c provided in each of the zones 60 is independently controlled by the control device 200.

[Configuration of Control Device 200]

Figure 4:
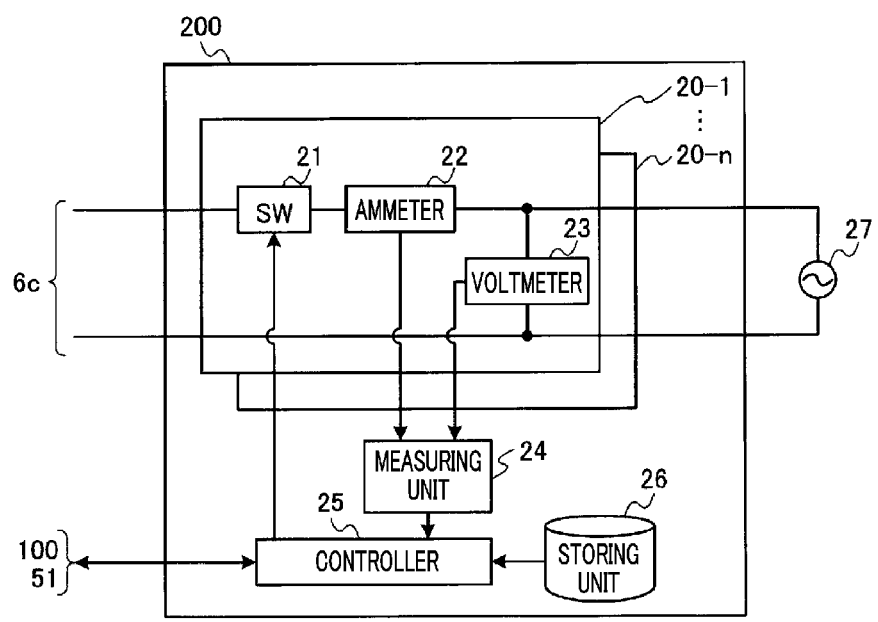
FIG. 4 is a block diagram illustrating an example of a configuration of a control device.

FIG. 4 is a block diagram illustrating an example of a configuration of the control device 200. As illustrated in FIG. 4, the control device 200 includes, e.g., multiple power supplies 20-1 to 20-$n$, a measuring unit 24, a controller 25, and a storing unit 26. Hereinafter, when the multiple power supplies 20-1 to 20-$n$ are not distinguished from each other but are generically named, the power supplies 20-1 to 20-$n$ are simply described as power supply 20.

One power supply 20 is provided for each of the heaters 6c provided in the corresponding one of the zones 60 of the electrostatic chuck 6, and supplies the electric power to the corresponding heater 6c. In the present exemplary embodiment, fifteen (15) heaters 6c are provided within the electrostatic chuck 6, and fifteen (15) power supplies 20 are provided corresponding to the heaters 6c, respectively, within the control device 200. Each of the power supplies 20 includes a switch (SW) 21, an ammeter 22, and a voltmeter 23.

The SW 21 is switched ON/OFF under the control of the controller 25, and supplies electric power supplied from an AC power supply 27 to the corresponding heater 6c during the ON period. The ammeter 22 is configured to measure an instantaneous value of an AC current supplied to the corresponding heater 6c from the AC power supply 27, and outputs the measured instantaneous value to the measuring unit 24. The voltmeter 23 is configured to measure an instantaneous value of an AC voltage supplied to the corresponding heater 6c from the AC power supply 27, and outputs the measured instantaneous value to the measuring unit 24.

The measuring unit 24 is configured to measure a resistance value of each heater 6c based on the measured voltage value and the measured current value of the heater 6c which have been output from each power supply 20. Then, the measuring unit 24 outputs the measured resistance value of each heater 6c to the controller 25.

Figure 5:
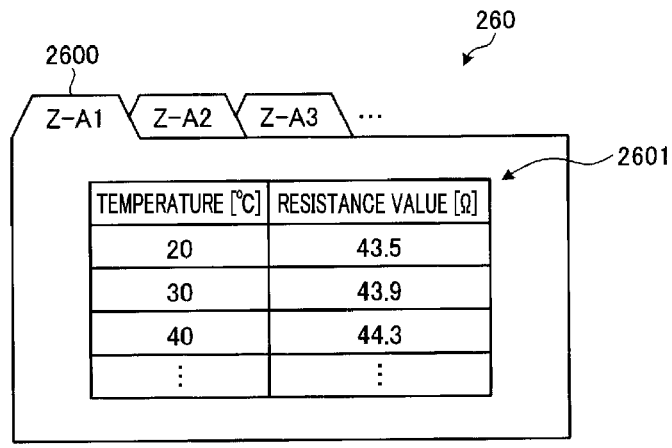
FIG. 5 is a view illustrating an example of a conversion table.

The storing unit 26 is configured to store therein a recipe indicating processing conditions for the substrate W, a conversion table 260, a calibration value table 261, and a coefficient table 262. FIG. 5 is a view illustrating an example of the conversion table 260. Individual tables 2601 are stored in the conversion table 260 for zone IDs 2600 for identifying the zones 60 provided with the heaters 6c, respectively. A resistance value of each of the heaters 6c is stored in association with a temperature in each of the individual tables 2601.

The recipe stored in the storing unit 26 includes information on a target temperature of each of the zones 60 in each process. Details of the calibration value table 261 and the coefficient table 262 will be described later. The recipe is created in advance by a manager of the processing system 10 and stored in the storing unit 26. The calibration value table 261 and the coefficient table 262 are created in a calibration processing to be described later. The conversion table 260 is created in a creation processing to be described later.

The controller 25 controls each component of the processing apparatus 100 based on the recipe stored in the storing unit 26. Also, the controller 25 controls the electric power to be supplied to each of the heaters 6c provided in the corresponding one of the zones 60 of the electrostatic chuck 6 during each process, so that the temperature of the substrate W placed on the electrostatic chuck 6 is controlled to be the target temperature indicated by the recipe. Further, the controller 25 performs the calibration processing of the IR camera 51 to be described later, and the creation processing of the conversion table 260.

[Temperature Control Processing]

Figure 6:
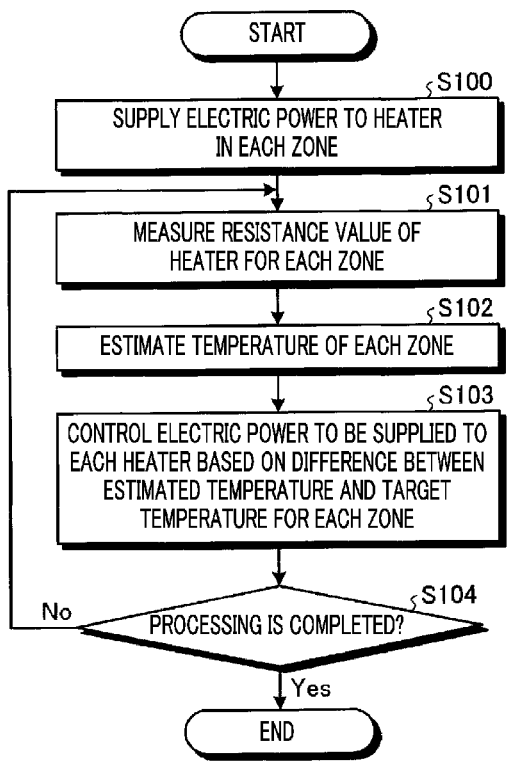
FIG. 6 is a flowchart illustrating an example of a temperature control processing.

FIG. 6 is a flowchart illustrating an example of a temperature control processing. For example, the control device 200 starts the temperature control processing illustrated in the present flowchart when the processing based on the recipe is initiated. Information such as the conversion table 260 and the recipe is stored in advance in the storing unit 26.

First, the controller 25 controls the SW 21 within each power supply 20 to start the supply of the electric power to each heater 6c (S100). Then, the measuring unit 24 measures the resistance value of the heater 6c in each zone 60 based on the instantaneous value of the AC current measured by the ammeter 22 and the instantaneous value of the AC voltage measured by the voltmeter 23 (S101). The measuring unit 24 obtains the average of the resistance values through multiple measurements during a predetermined period of time (e.g., for several seconds) for each heater 6c, and outputs the average resistance value to the controller 25.

Thereafter, the controller 25 estimates a temperature corresponding to the resistance value of the heater 6c provided in the zone 60 as a temperature of the zone 60 with reference to the conversion table 260 within the storing unit 26 for each zone 60 (S102). Then, the controller 25 controls the ratio of switching ON/OFF of the SW 21 within the power supply 20 according to a difference between the estimated temperature and a target temperature for each zone 60 and thus controls the electric power to be supplied to the heater 6c (S103).

Then, the controller 25 determines whether the processing is completed with reference to the recipe (S104). When it is determined that the processing is not completed (S104: No), the measuring unit 24 executes the processing described in process S101 again. When it is determined that the processing is completed (S104: Yes), the control device 200 ends the temperature control processing illustrated in the present flowchart.

Here, when a temperature sensor is provided within the base 2a for each of the zones 60 of the electrostatic chuck 6 to measure the temperature of each of the zones 60, a space where the temperature sensors are to be placed is required in the base 2a. The electrostatic chuck 6 may be divided into more zones 60 in order to more precisely control the temperature distribution of the electrostatic chuck 6. Thus, more temperature sensors may be placed in the base 2a according to the number of the zones 60. As the number of the temperature sensors placed in the base 2a increases, it becomes difficult to miniaturize the base 2a. Further, when the number of temperature sensors placed in the base 2a increases, the structure of the base 2a becomes complicated and the degree of freedom in design decreases.

However, in the processing system 10 according to the present exemplary embodiment, the temperature of each of the zones 60 is estimated based on the resistance value of the corresponding one of the heaters 6c provided in the corresponding one of the zones 60 within the electrostatic chuck 6. Accordingly, it becomes not necessary to place the temperature sensors in the base 2a, and it becomes possible to miniaturize the base 2a. Since the number of the temperature sensors placed in the base 2a may be reduced, the structure of the base 2a may be simplified and the degree of freedom in design may also be improved.

[Creation of Conversion Table 260]

Figure 7:
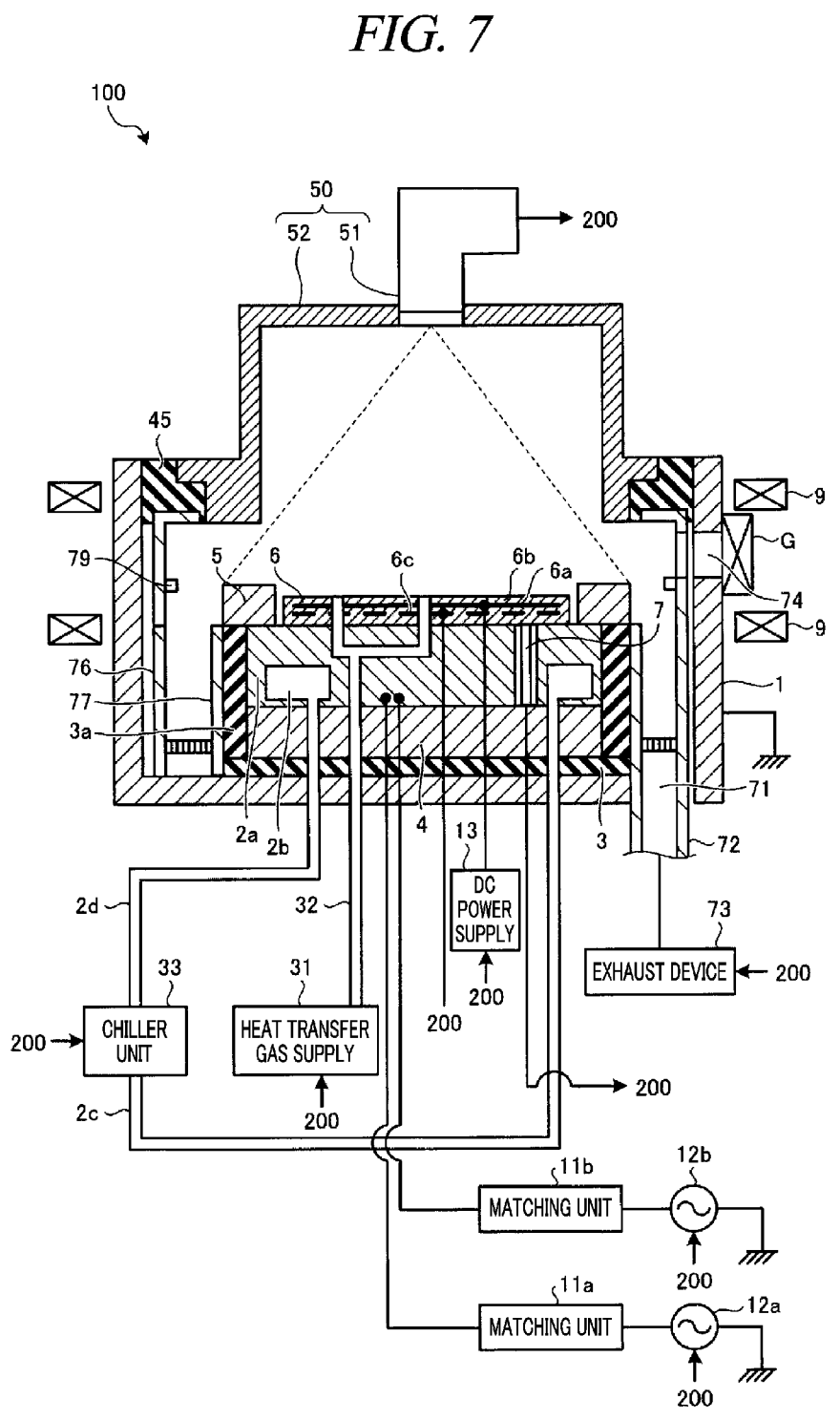

To control the temperature of each heater 6c, the conversion table 260 shown in, e.g., FIG. 5 needs to be created in advance. Hereinafter, a method of creating the conversion table 260 will be described. The conversion table 260 is created by the processing apparatus 100 configured as shown in, e.g., FIG. 7. FIG. 7 is a schematic cross-sectional view illustrating an example of a configuration of the processing apparatus 100 when the conversion table 260 is created in the first exemplary embodiment. The processing system 10 including the processing apparatus 100 and the control device 200 for creating the conversion table 260 as shown in FIG. 7 is an example of a calibration system.

For example, as illustrated in FIG. 7, when the conversion table 260 is created, the shower head 16 described with reference to FIG. 2 is separated from the chamber 1, and a calibration unit 50 is provided at the chamber 1. In FIG. 7, members denoted by the same reference numerals as those in FIG. 2 have the same or similar functions as the members illustrated in FIG. 2 except for the points described below, and thus descriptions thereof will be omitted.

The calibration unit 50 includes an infrared (IR) camera 51 and a cover member 52. The cover member 52 supports the IR camera 51 such that an imaging direction of the IR camera 51 faces the electrostatic chuck 6. The IR camera 51 measures a distribution of a radiation amount of infrared light emitted from the top surface of the electrostatic chuck 6. Hereinafter, a measurement value of the radiation amount of the infrared light will be described as "IR value". The IR camera 51 outputs information indicating the distribution of the measured IR value to the control device 200.

Figure 8:
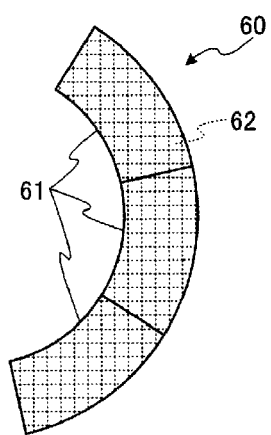
FIG. 8 is a view illustrating an example of a zone imaged by an IR camera.

For example, as shown in FIG. 8, a zone 60 in an image taken by the IR camera 51 includes multiple pixels 62. FIG. 8 is a view illustrating an example of the zone 60 imaged by the IR camera 51. The pixels 62 correspond to IR values, respectively. In the present exemplary embodiment, the controller 25 of the control device 200 divides each zone 60 into multiple division zones 61, averages the IR values of the pixels within the division zone 61 for each division zone 61, and uses the average IR value as an IR value for the division zone 61.

Further, the multiple protrusions are formed on the top surface of the electrostatic chuck 6. There exists a slight thermal gradient between tip ends of the protrusions and the top surface of the electrostatic chuck 6. For this reason, there is a slight difference in temperature between the tip ends of the protrusions and the top surface of the electrostatic chuck 6. Since the temperature of each division zone 61 corresponds to the average of the IR values measured within the corresponding division zone 61, if there is a large difference in the number of protrusions between the division zones 61, the temperatures measured from the respective division zones 61 are different from each other even when the temperature of the entire electrostatic chuck 6 is uniform. For this reason, it is desirable to place the division zones 61 with a small difference between the division zones 61 in the number of protrusions included in each division zone 61.

Here, the measured IR values vary depending on the temperature change or the aging of the IR camera 51 itself. Further, there exists a device difference in the measured IR value between different IR cameras 51. If the IR values measured by the IR camera 51 are not uniform, it becomes difficult to accurately measure temperature of each zone 60. For this reason, the accuracy of the conversion table 260 that indicates a corresponding relationship between the resistance values and the temperatures of the heater 6c in each zone 60 is degraded. Therefore, the estimation accuracy in temperatures of the respective zones 60 of the electrostatic chuck 6 which are estimated from the resistance values of the heaters 6c embedded in the respective zones 60 is degraded.

Accordingly, in the present exemplary embodiment, the IR camera 51 is calibrated before the conversion table 260 is created, and then, the conversion table 260 is created using the calibrated IR camera 51. Hereinafter, a calibration processing of the IR camera 51 will be described.

[Calibration Processing of IR Camera 51]

Figure 9:
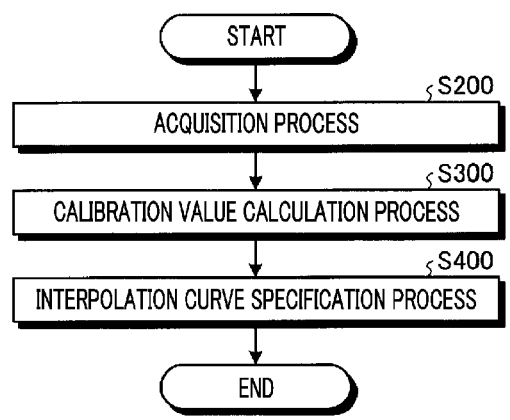
FIG. 9 is a flowchart illustrating an example of a calibration processing of the IR camera.

FIG. 9 is a flowchart illustrating an example of a calibration processing of the IR camera 51. The calibration processing shown in FIG. 9 is implemented by the control device 200 that controls the IR camera 51 and each component of the processing apparatus 100. Further, the calibration processing of the IR camera 51 is performed, e.g., when the calibrated IR camera 51 is tested and a first test result of the calibrated IR camera 51 is not within a predetermined reference range or at a predetermined period of time (e.g., several days to several months).

In the calibration processing, the controller 25 performs first an acquisition process (S200). In the acquisition process, the electrostatic chuck 6 on which the substrate W is placed is set to different temperatures and IR values of the respective division zones 61 in the top surface of the the electrostatic chuck 6 are measured by the IR camera 51 at the respective temperatures.

Then, the controller 25 performs a calibration value calculation process (S300). In the calibration value calculation process, a difference between an IR value of a reference zone which is the division zone 61 provided with the temperature sensor 7 and an IR value of another division zone 61 is calculated as a calibration value at the respective temperatures.

Then, the controller 25 performs an interpolation curve specification process (S400). In the interpolation curve specification process, an interpolation curve indicating a variation tendency of the calibration value with respect to the IR value of the reference zone is specified for each division zone 61.

[Acquisition Process]

Figure 10:
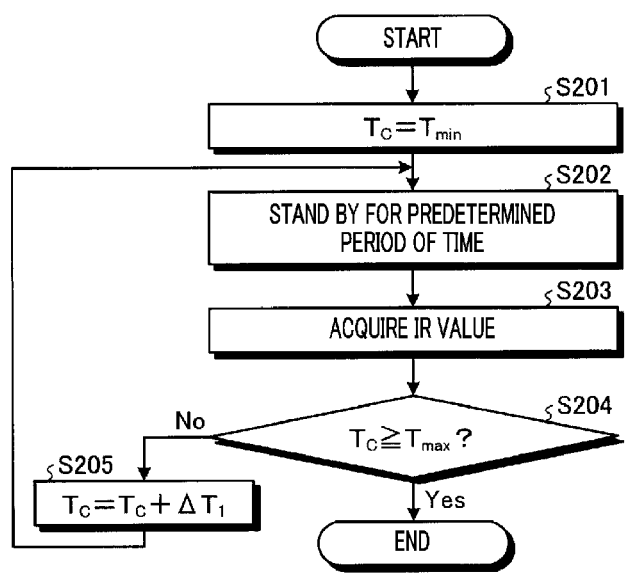
FIG. 10 is a flowchart illustrating an example of an acquisition process.

FIG. 10 is a flowchart illustrating an example of an acquisition process.

First, the controller 25 controls the chiller unit 33 to set a setting temperature value $T_C$ for the heat transfer medium to a first temperature $T_{min}$ (S201). The first temperature $T_{min}$ is, e.g., 0° C. The first temperature $T_{min}$ may also be lower or higher than 0° C. Then, the controller 25 stands by for a predetermined period of time until the temperature of the electrostatic chuck 6 is stabilized (S202).

Then, the controller 25 acquires the IR values of the top surface of the electrostatic chuck 6 which have been measured by the IR camera 51 (S203). The pixels in the image taken by the IR camera 51 correspond to the IR values, respectively. Then, the controller 25 determines whether the setting temperature value $T_C$ for the heat transfer medium is equal to or higher than a second temperature $T_{max}$ (S204). The second temperature $T_{max}$ is, e.g., 80° C. The second temperature $T_{max}$ may also be lower or higher than 80° C.

When the setting temperature value $T_C$ for the heat transfer medium is lower than the second temperature $T_{max}$ (S204: No), the controller 25 increases the setting temperature value $T_C$ for the heat transfer medium by a predetermined temperature $\Delta T_1$ (S205) and then performs the process S202 again. The predetermined temperature $\Delta T_1$ is, e.g., 10° C. The predetermined temperature $\Delta T_1$ may also be lower or higher than 10° C.

When the setting temperature value $T_C$ for the heat transfer medium is equal to or higher than the second temperature $T_{max}$ (S204: Yes), the controller 25 ends the acquisition process illustrated in the present flowchart. Thus, the IR values of the respective pixels corresponding to the different temperatures can be acquired.

[Calibration Value Calculation Process]

Figure 11:
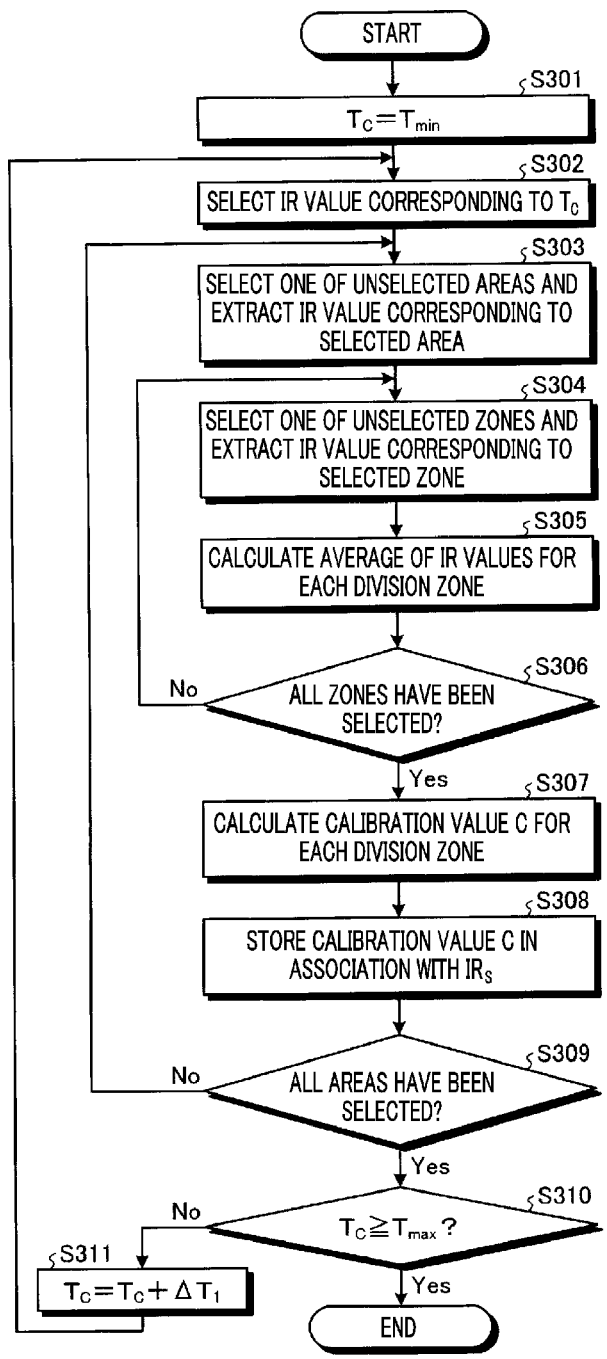
FIG. 11 is a flowchart illustrating an example of a calibration value calculation process.

FIG. 11 is a flowchart illustrating an example of a calibration value calculation process. The processings in the calibration value calculation process shown in FIG. 11 are performed using distribution data on the IR values for the respective pixels at the different temperatures which have been acquired in the acquisition process.

First, the controller 25 sets the setting temperature value $T_C$ for the heat transfer medium to the first temperature $T_{min}$ (S301). Then, the controller 25 selects an IR value corresponding to the setting temperature value $T_C$ from the data acquired in the acquisition process (S302).

Then, the controller 25 selects one of unselected areas and extracts an IR value corresponding to the selected area from the IR values selected in process S302 (S303).

Then, the controller 25 selects one of unselected zones 60 from the area selected in the process S303 and extracts an IR value corresponding to the selected zone 60 from the IR values selected in the process S303 (S304).

Then, the controller 25 uses the IR value extracted in the process S304 to calculate an average $IR_A$ of the IR values for each of the division zones 61 in the zone 60 selected in the process S304 (S305).

Then, the controller 25 determines whether all the zones 60 in the area selected in the process S303 have been selected (S306). If there exists an unselected zone 60 (S306: No), the process S304 is performed again.

If all the zones 60 have been selected (S306: Yes), the controller 25 calculates a calibration value C for each division zone 61 (S307). Then, the controller 25 matches the calculated calibration value C with $IR_S$ and stores them in the calibration value table 261 to be described later (S308).

The calibration value C for each division zone 61 is calculated using the $IR_A$ for the division zones 61 and the $IR_S$ which is the average of the IR values for the division zone 61 provided with the temperature sensor 7 in the area selected in the process S303 as shown in, e.g., the following Equation 1.

[Equation 1]

$$C=IR_S-IR_A \quad (1)$$

Then, the controller 25 determines whether all the areas have been selected (S309). If there exists an unselected area (S309: No), the process S303 is performed again.

If all the areas have been selected (S309: Yes), the controller 25 determines whether the setting temperature value $T_C$ for the heat transfer medium is equal to or higher than the second temperature $T_{max}$ (S310). When the setting temperature value $T_C$ for the heat transfer medium is lower than the second temperature $T_{max}$ (S310: No), the controller 25 increases the setting temperature value $T_C$ for the heat transfer medium by the predetermined temperature $\Delta T_1$ (S311), and then, performs the process S302 again.

Figure 12:
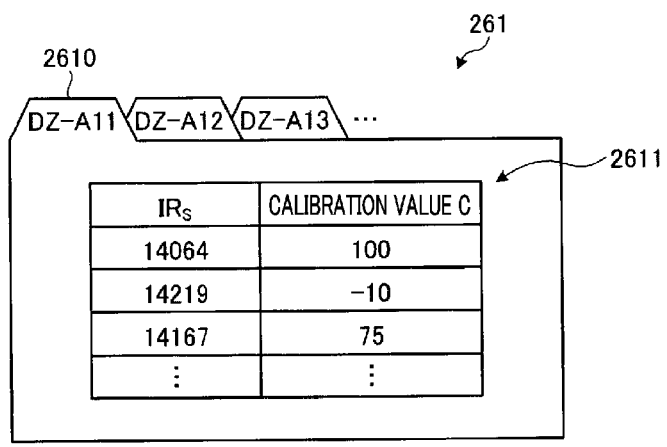
FIG. 12 is a view illustrating an example of a calibration value table.

When the setting temperature value $T_C$ for the heat transfer medium is equal to or higher than the second temperature $T_{max}$ (S310: Yes), the controller 25 ends the calibration value calculation process illustrated in the present flowchart. Thus, the calibration value table 261 having, e.g., a data structure shown in FIG. 12 is stored in the storing unit 26. FIG. 12 is a view illustrating an example of the calibration value table 261. Individual tables 2611 are stored in the calibration value table 261 for division zone IDs 2610 for identifying the respective division zones 61. The calibration value C is stored in association with $IR_S$ in each of the individual tables 2611.

[Interpolation Curve Specification Process]

Figure 13:
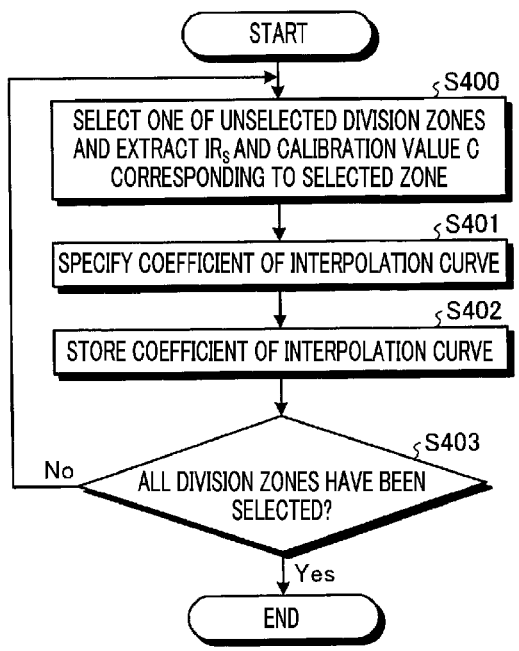
FIG. 13 is a flowchart illustrating an example of an interpolation curve specification process.

FIG. 13 is a flowchart illustrating an example of an interpolation curve specification process. The processings in the interpolation curve specification process shown in FIG. 13 are performed using data in the calibration value table 261 stored in the calibration value calculation process.

First, the controller 25 selects one of unselected division zones 61 and extracts the $IR_S$ and the calibration value C corresponding to the selected division zone 61 from the calibration value table 261 (S400). Then, the controller 25 uses the extracted $IR_S$ and calibration value C to specify a coefficient of an interpolation curve indicating the variation tendency of the calibration value C with respect to the $IR_S$ (S401).

Figures 14, 15:
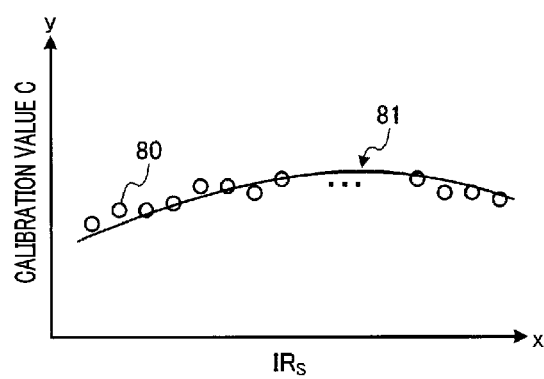
FIG. 14 is a view provided to explain an example of specifying a coefficient in an interpolation curve.
FIG. 15 is a view illustrating an example of a coefficient table.

FIG. 14 is a view provided to explain an example of specifying the coefficient of the interpolation curve. The controller 25 plots the calibration values C extracted in the process S400 as data 80 on, e.g., the XY coordinate plane with the $IR_S$ as an X-axis and the calibration values C as a Y-axis, and then, specifies an interpolation curve 81 indicating a tendency of the plotted data 80. In the present exemplary embodiment, the interpolation curve 81 is a quadratic curve represented by the following Equation 2.

[Equation 2]

$$Y=aX^2+bX+c \quad (2)$$

In the above Equation 2, a, b and c are coefficients of the interpolation curve 81. The coefficients a, b and c are an example of parameters of the interpolation curve 81. The interpolation curve 81 may also be a curve having a degree of three or higher. The controller 25 may specify an approximate straight line instead of the interpolation curve 81 as a line indicating the tendency of the plotted data 80.

Then, the controller 25 stores the coefficients a, b and c of the interpolation curve 81 shown in the above Equation 2 in the coefficient table 262 to be described later (S402). The process S402 is an example of a storing process.

Then, the controller 25 determines whether all the division zones 61 have been selected (S403). If there exists an unselected division zone 61 (S403: No), the process S400 is performed again.

If all the division zones 61 have been selected (S403: Yes), the controller 25 ends the interpolation curve specification process illustrated in the present flowchart. Thus, the coefficient table 262 having, e.g., a data structure shown in FIG. 15 is stored in the storing unit 26. FIG. 15 is a view illustrating an example of the coefficient table 262 according to the present exemplary embodiment. The coefficients a, b and c of the interpolation curve in association with the division zone IDs for identifying the respective division zones 61 are stored in the coefficient table 262.

[Temperature Measurement Processing]

Figure 16:
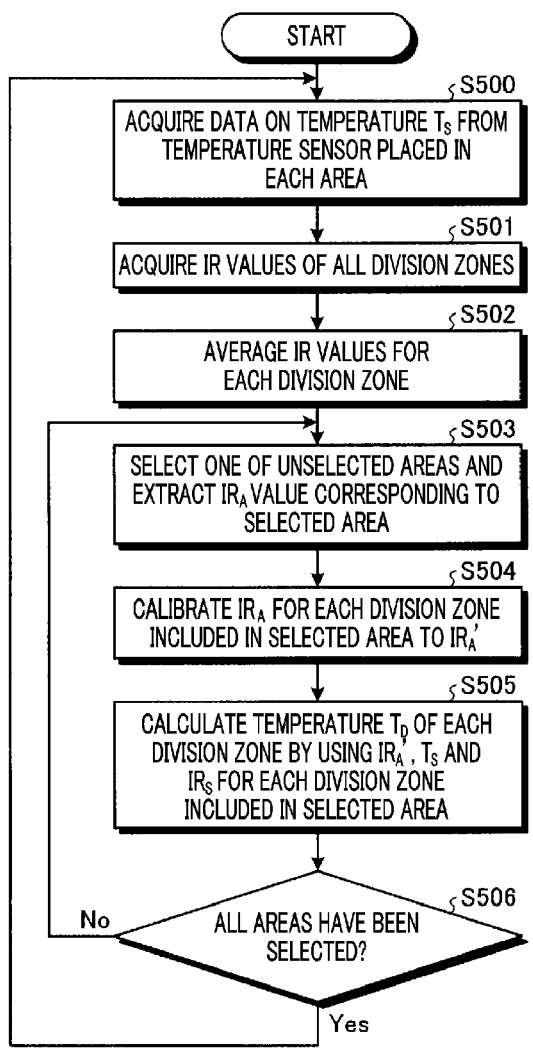
FIG. 16 is a flowchart illustrating an example of a temperature measurement processing.

Hereinafter, a processing of measuring the temperature of each division zone 61 on the electrostatic chuck 6 from the image taken by the IR camera 51 by using the coefficient table 262 created in the calibration processing will be described. FIG. 16 is a flowchart illustrating an example of a temperature measurement process. The temperature measurement process shown in FIG. 16 is implemented by the control device 200 that controls the IR camera 51 and each component of the processing apparatus 100.

First, the controller 25 acquires data on a temperature $T_S$ from the temperature sensor 7 provided in each area of the electrostatic chuck 6 (S500). Then, the controller 25 acquires IR values of all the division zones 61 of the electrostatic chuck 6 from the IR camera 51 (S501). Then, the controller 25 calculates an average $IR_A$ of IR values for each of the division zones 61 (S502).

Thereafter, the controller 25 selects one of unselected areas and extracts $IR_A$ for division zones 61 included in the selected area from $IR_A$ calculated in process S502 (S503).

Thereafter, the controller 25 calibrates the $IR_A$ for each of the division zones 61 included in the area selected in the process S503 to calculate $IR_A'$ (S504). More specifically, the controller 25 extracts, as the $IR_S$, the $IR_A$ for division zones 61 provided with the temperature sensors 7 from the $IR_A$ for the division zones 61 included in the area selected in the process S503. Then, the controller 25 extracts the coefficient of the interpolation curve form the coefficient table 262 for each of the division zones 61 included in the area selected in the process S503. Then, the controller 25 specifies the calibration value C corresponding to the $IR_S$ in the interpolation curve corresponding to the extracted coefficient for each division zone 61. Then, the controller 25 calculates the corrected $IR_A'$ for each division zone 61 by using the following Equation 3.

[Equation 3]

$$IR_A' = IR_A + C \quad (3)$$

Thus, it is possible to calibrate a measurement error of the IR camera 51 for each division zone 61 and improve the accuracy in the IR values of the division zones 61.

Then, the controller 25 uses the $IR_A'$ for the division zones 61 in the area selected in the process S503, the temperatures $T_S$ from the temperature sensor 7 in the selected area, and the $IR_S$ for the division zone 61 provided with the temperature sensor 7 to calculate a temperature $T_D$ of the division zone 61 (S505). The controller 25 calculates the temperature $T_D$ of each division zone by using, e.g., the following Equation 4.

[Equation 4]

$$T_D = T_S \times \sqrt[4]{\frac{IR_A'}{IR_S}} \quad (4)$$

Thereafter, the controller 25 determines whether all the areas have been selected (S506). If there exists an unselected area (S506: No), the controller 25 performs the process S503 again. If all the areas have been selected (S506: Yes), the controller 25 performs the process S500 again.

[Experimental Result]

Figure 17:
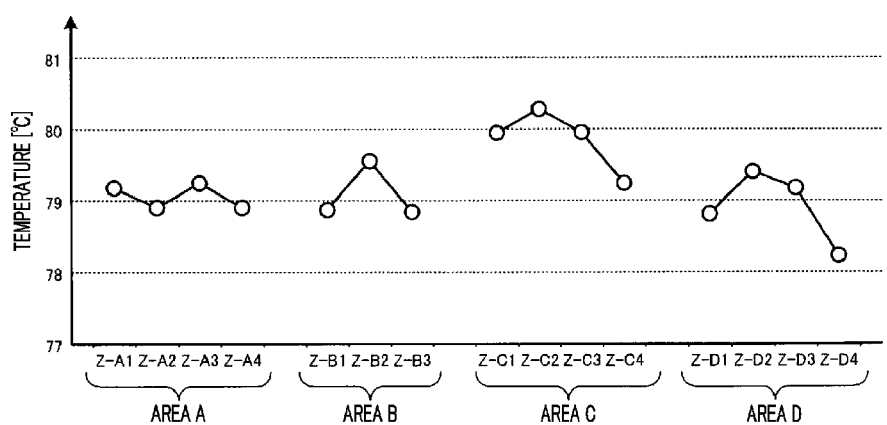
FIG. 17 is a view illustrating an example of a measurement result on temperature distribution in each zone according to a comparative example.
Figure 18:
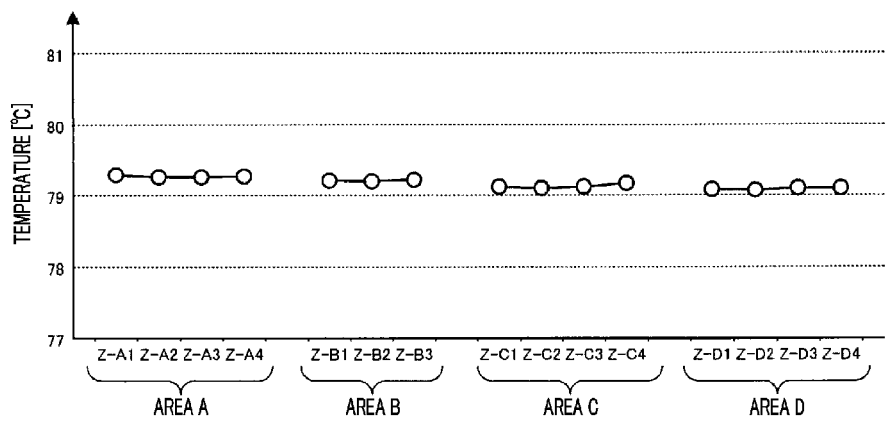
FIG. 18 is a view illustrating an example of a measurement result on temperature distribution in each zone.

FIG. 17 is a view illustrating an example of a measurement result on the temperature distribution in each zone 60 according to a comparative example. FIG. 18 is a view illustrating an example of a measurement result on the temperature distribution in each zone 60 according to the present exemplary embodiment. In the experiment, the chiller unit 33 is controlled to set the temperature of the heat transfer medium flowing within the base 2a to 80° C. Further, in the experiment, the supply of the electric power to each heater 6c is stopped. Since the temperature of the heat transfer medium flowing within the base 2a is 80° C., the temperature of the top surface of the electrostatic chuck 6 is also uniformly maintained at about 80° C. Further, in FIG. 17 and FIG. 18, the average of temperature measurement values of the division zones 61 included in each zone 60 is plotted as the temperature of the corresponding zone 60.

In the comparative example, the IR values measured by the IR camera 51 are used and the temperatures of the respective zones 60 are measured. In the comparative example, for example, as shown in FIG. 17, the temperature measurement values of the zones 60 in each area are not uniform. In the comparative example, the temperature measurement values of the zones 60 in the area D show the highest non-uniformity and a difference between the maximum and the minimum value is about 1.18° C.

In contrast, in the present exemplary embodiment, for example, as shown in FIG. 18, the temperature measurement values of the zones 60 in each area show a much lower range of non-uniformity than those of the comparative example. In the example shown in FIG. 18, the temperature measurement values of the zones 60 in the area D show the highest non-uniformity and the difference between the maximum value and the minimum value is about 0.09° C.

As described above, the IR values of the IR camera 51 are calibrated using the coefficient table 262 specified in the calibration processing of the IR camera 51, and, thus, the temperature measurement accuracy of the IR camera 51 can be improved.

[Creation Processing of Conversion Table 260]

Figure 19:
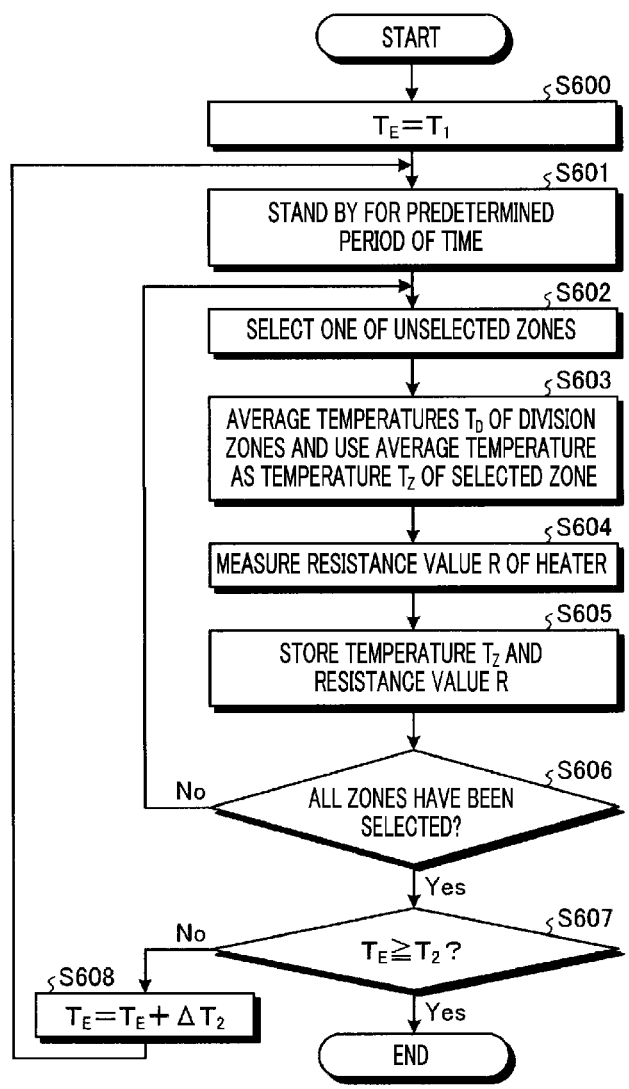
FIG. 19 is a flowchart illustrating an example of a creation processing of the conversion table.

FIG. 19 is a flowchart illustrating an example of a creation processing of the conversion table 260. For example, the control device 200 starts a processing illustrated in the present flowchart when an instruction to create the conversion table 260 is received from the manager of the processing system 10. Further, the temperature measurement processing shown in FIG. 16 is performed in parallel with the creation processing of the conversion table 260 shown in FIG. 19.

First, the controller 25 controls the electric power to be supplied to the chiller unit 33 and each heater 6c to set a temperature $T_E$ of the electrostatic chuck 6 to a predetermined temperature $T_1$ (S600). The predetermined temperature $T_1$ is, e.g., 20° C. The predetermined temperature $T_1$ may also be lower or higher than 20° C. Then, the controller 25 stands by for a predetermined period of time until the temperature of the electrostatic chuck 6 is stabilized (S601).

Then, the controller 25 selects one of unselected zones 60 (S602). Then, the controller 25 extracts temperatures $T_D$ of division zones 61 included in the zone 60 selected in the process S602 from the temperatures $T_D$ of the respective division zones 61 which have been measured in the temperature measurement processing shown in FIG. 16. Then, the controller 25 averages the extracted temperatures $T_D$ of the division zones 61 and uses the average temperature $T_D$ as a temperature $T_Z$ of the zone 60 selected in the process S602 (S603).

Then, the measuring unit 24 measures the resistance value R of the heater 6c provided in the zone 60 selected in the process S602 based on the measured voltage and current values of the heater 6c which have been output from the power supply 20 (S604). Then, the controller 25 matches the temperature $T_Z$ specified in the process S603 and the resistance value R calculated in the process S604 with the zone 60 selected in the process S602 and stores them in the conversion table 260 (S605).

Thereafter, the controller 25 determines whether all the zones 60 have been selected (S606). If there exists an unselected zone 60 (S606: No), the controller 25 performs the process S602 again.

If all the zones 60 have been selected (S606: Yes), the controller 25 determines whether the temperature $T_E$ of the electrostatic chuck 6 is equal to or higher than a predetermined temperature $T_2$ (S607). The predetermined temperature $T_2$ is, e.g., 120° C. The predetermined temperature $T_2$ may also be lower or higher than 120° C.

When the temperature $T_E$ of the electrostatic chuck 6 is lower than the predetermined temperature $T_2$ (S607: No), the controller 25 controls the electric power to be supplied to the chiller unit 33 and each heater 6c to increase the temperature $T_E$ of the electrostatic chuck 6 by a predetermined temperature $\Delta T_2$ (S608). Then, the controller 25 performs the process S601 again. The predetermined temperature $\Delta T_2$ is, e.g., 10° C. The predetermined temperature $\Delta T_2$ may also be lower or higher than 10° C.

When the temperature $T_E$ of the electrostatic chuck 6 is equal to or higher than the predetermined temperature $T_2$ (S607: Yes), the controller 25 ends the creation processing of the conversion table 260 illustrated in the present flowchart. Thus, the conversion table 260 shown in, e.g., FIG. 5 is created.

The first exemplary embodiment of the present disclosure has been described above. A calibration method of the IR camera 51 includes setting the electrostatic chuck 6 on which the substrate W is placed to different temperatures and acquiring the IR value which is a measurement value of radiation amount of infrared light emitted from each of multiple division zones 61 provided in a top surface of the electrostatic chuck 6 by the IR camera 51 at each of the temperatures; calculating, as the calibration value C, a difference between the IR value of the reference zone which is the division zone 61 provided with the temperature sensor 7 and the IR value of another zone at each of the temperatures; specifying an interpolation curve indicating a variation tendency of the calibration value C with respect to the IR value of the reference zone for each of the division zones 61; and storing parameters of the interpolation curve specified for each of the division zones 61. The temperature measurement accuracy of the IR camera 51 can be improved by using calibration values in the interpolation curve based on the stored parameters.

The IR camera 51 is configured to output the IR value for each of multiple pixels, and the IR value of each of the division zones 61 is the average of the IR values for the multiple pixels when the corresponding division zone 61 is imaged by the IR camera 51. Accordingly, an operation amount for calibrating IR values can be reduced.

Multiple protrusions are formed on a surface of the electrostatic chuck 6 where the substrate W is placed, and the division zones 61 are arranged such that a difference in numbers of the protrusions formed in the division zones 61 is small. Accordingly, the temperature measurement accuracy for each division zone 61 can be improved.

The flow path 2b through which a heat transfer medium whose temperature is controlled flows is formed within the base 2a, and in the acquiring of the IR value, the temperatures of the electrostatic chuck 6 and the flow path 2b are set by controlling the temperature of the heat transfer medium flowing through the flow path 2b. Accordingly, the temperature of the entire electrostatic chuck 6 can be uniform.

Second Embodiment

In the above-described first exemplary embodiment, the IR values for the respective division zones 61 are calibrated based on the temperatures $T_S$ measured by the temperature sensors 7 provided within the base 2a. In contrast, in the present exemplary embodiment, a measurement substrate W' equipped with multiple temperature sensors 70 is placed on the electrostatic chuck 6 and the IR values for the respective division zones 61 are calibrated based on temperatures $T_S$ of the measurement substrate W' measured by the temperature sensors 70. Thus, the IR values for the respective division zones 61 can be calibrated based on the temperature distribution close to the actual temperature distribution of the substrate W and the temperature measurement accuracy of the IR camera 51 can be further improved.

Figure 20:
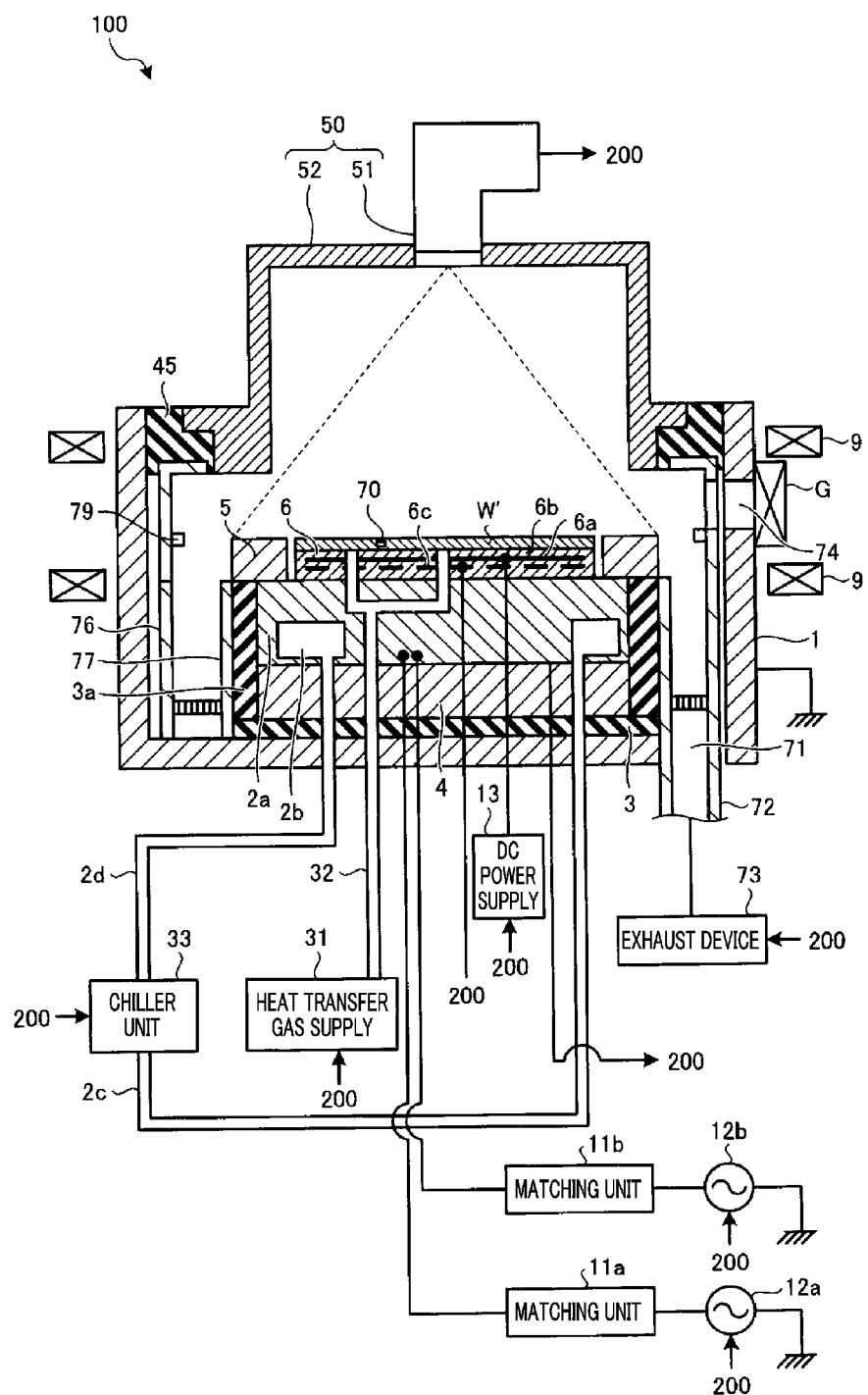
FIG. 20 is a schematic cross-sectional view illustrating an example of a configuration of the processing apparatus when the conversion table is created in a second exemplary embodiment.

In the present exemplary embodiment, the conversion table 260 is created by the processing apparatus 100 configured as shown in, e.g., FIG. 20. FIG. 20 is a schematic cross-sectional view illustrating an example of a configuration of the processing apparatus 100 when the conversion table 260 is created in the second exemplary embodiment. The processing system 10 including the processing apparatus 100 and the control device 200 shown in FIG. 20 is an example of a calibration system.

In the present exemplary embodiment, for example, as illustrated in FIG. 20, when the conversion table 260 is created, the shower head 16 is separated from the chamber 1, and the calibration unit 50 is provided at the chamber 1. Then, the measurement substrate W' equipped with the multiple temperature sensors 70 is placed on the electrostatic chuck 6. In the present exemplary embodiment, IR values for the respective division zones 61 are calibrated based on the temperatures $T_S$ of the measurement substrate W' measured by the temperature sensors 70. Therefore, the temperature sensor 7 may not be provided within the base 2a for the purpose of calibrating the IR values for the respective division zones 61. In the example shown in FIG. 20, the temperature sensor 7 is not provided within the base 2a. Thus, the base 2a can be further miniaturized, or the base 2a can have a simpler structure. In FIG. 20, members denoted by the same reference numerals as those in FIG. 2 or FIG. 7 have the same or similar functions as the members illustrated in FIG. 2 or FIG. 7 except for the points described below, and thus descriptions thereof will be omitted.

The cover member 52 supports the IR camera 51 such that the imaging direction of the IR camera 51 faces the measurement substrate W' placed on the electrostatic chuck 6. The IR camera 51 measures a distribution of a radiation amount of infrared light emitted from a top surface of the measurement substrate W'. Then, the IR camera 51 outputs information indicating the distribution of the measured values of the radiation amount of the infrared light to the control device 200. Hereinafter, the measurement value of the radiation amount of the infrared light will be described as "IR value". The IR value in the present exemplary embodiment is a measurement value of the radiation amount of the infrared light emitted from the surface of the measurement substrate W'.

Figure 21:
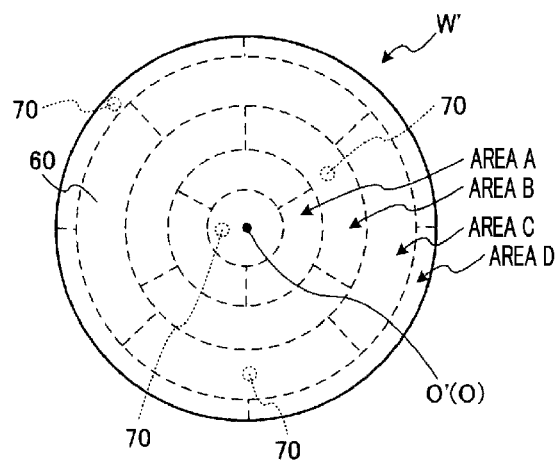
FIG. 21 is a view illustrating an example of the placement of temperature sensors provided in a measurement substrate.

FIG. 21 is a view illustrating an example of the arrangement of the temperature sensors 70 provided in the measurement substrate W'. The measurement substrate W' is equipped with the multiple temperature sensors 70. The temperature sensors 70 are, e.g., thermocouples or resistance thermometers. The measurement substrate W' is placed on the electrostatic chuck 6 such that a reference position of the measurement substrate W' coincides with a reference position of the electrostatic chuck 6. The reference position of the measurement substrate W' is, e.g., a position O' of a center axis of the substantially circular plate-shaped measurement substrate W'. The reference position of the electrostatic chuck 6 is, e.g., a position O of a center axis of the electrostatic chuck having a substantially cylindrical shape. The multiple temperature sensors 70 are arranged in the measurement substrate W' such that one temperature sensor 70 can be provided at a position corresponding to each of areas A to D in the top surface of the electrostatic chuck 6 as shown in, e.g., FIG. 21 when the measurement substrate W' is placed on the electrostatic chuck 6.

In the present exemplary embodiment, the multiple temperature sensors 70 are embedded in the measurement substrate W'. Thus, it is possible to suppress the disturbance of the infrared light emitted from the surface of the measurement substrate W' toward the IR camera 51 by the temperature sensors 70. Further, the multiple temperature sensors 70 are provided in the surface of the measurement substrate W', and the measurement substrate W' may be placed on the electrostatic chuck 6 such that the surface of the measurement substrate W' where the temperature sensors 70 are provided faces the IR camera 51. Thus, the temperatures of the surface of the measurement substrate W' can be measured with higher accuracy by the temperature sensors 70. Also, the measurement substrate W' equipped with the multiple temperature sensors 70 can be readily prepared. If the temperature sensors 70 are provided in the surface of the measurement substrate W', it is desirable to mask an IR value of the infrared light emitted from portions of the measurement substrate W' where the temperature sensors 70 are provided and substitute the IR value with a value interpolated based on IR values of areas around the temperature sensors 70.

In the present exemplary embodiment, at least one of two main surfaces of the measurement substrate W' is coated with a material having higher infrared emissivity than silicon. For example, at least one of two main surfaces of the measurement substrate W' is coated with a black material. Otherwise, at least one of two main surfaces of the measurement substrate W' may be coated with a red material or a green material instead of the black material as long as the red material or the green material has higher infrared emissivity than silicon. Also, a method of coating the measurement substrate W' is not limited to the coating, and a plate-shaped material or a film-shaped material having higher infrared emissivity than silicon may be attached to at least one of two main surfaces of the measurement substrate W'. Further, a material having higher infrared emissivity than silicon and thermal conductivity equivalent to silicon may be used as the measurement substrate W'. The material may be, e.g., an alumite-treated aluminum alloy. Such a material or any material having characteristics equivalent thereto may be processed into a plate shape or a film shape, and then, attached to at least one of two main surfaces of the measurement substrate W'. The measurement substrate W' is placed on the electrostatic chuck 6 such that the surface coated with the material having higher infrared emissivity than silicon faces the IR camera 51. Thus, the IR camera 51 can efficiently receive infrared light emitted from the measurement substrate W'.

The second exemplary embodiment is substantially the same as the first exemplary embodiment except that the measurement values of the infrared light emitted from the measurement substrate W' are used as the IR values and the temperatures measured by the temperature sensors 70 provided on the measurement substrate W' corresponding to the respective areas are used as the temperature $T_S$, and, thus, redundant description thereof will be omitted.

The second exemplary embodiment of the present disclosure has been described above. A calibration method of the IR camera 51 includes setting the electrostatic chuck 6 on which the substrate W is placed to different temperatures and acquiring the IR value which is a measurement value of radiation amount of infrared light emitted from each of multiple division zones 61 provided in a top surface of the measurement substrate W' placed on the electrostatic chuck 6 by the IR camera 51 at each of the temperatures; calculating, as the calibration value C, a difference between the IR value of a reference zone which is the division zone 61 corresponding to the position of the temperature sensor 70 provided in the measurement substrate W' and the IR value of another division zones 61 at each of the temperatures; specifying an interpolation curve indicating a variation tendency of the calibration value C with respect to the IR value of the reference zone for each of the division zones 61; and storing parameters of the interpolation curve specified for each of the division zones 61. The temperature measurement accuracy of the IR camera 51 can be improved by using calibration values in the interpolation curve based on the stored parameters.

The processing system 10 as an example of a calibration system according to the present exemplary embodiment includes the chamber 1, the electrostatic chuck 6, the temperature sensor 70, IR camera 51 and the control device 200. The electrostatic chuck 6 is provided within the chamber 1, and the measurement substrate W' is placed on the electrostatic chuck 6. The temperature sensor 70 is provided in the measurement substrate W', and is configured to measure a temperature of the measurement substrate W'. The IR camera 51 is configured to measure a radiation amount of infrared light emitted from a top surface of the measurement substrate W' placed on the electrostatic chuck 6. The control device 200 performs: setting the electrostatic chuck 6 to different temperatures and acquiring the IR value which is a measurement value of radiation amount of the infrared light emitted from each of multiple division zones 61 provided in the top surface of the measurement substrate W' placed on the electrostatic chuck 6 by the IR camera 51 at each of the temperatures; calculating, as the calibration value C, a difference between the IR value of a reference zone which is the division zone 61 corresponding to the position of the temperature sensor 70 and the IR value of another division zone 61 at each of the temperatures; specifying an interpolation curve indicating a variation tendency of the calibration value C with respect to the IR value of the reference zone for each of the division zones 61; and storing parameters of the interpolation curve specified for each of the division zones 61. The temperature measurement accuracy of the IR camera 51 can be improved by using calibration values in the interpolation curve based on the stored parameters.

In the calibration system according to the present exemplary embodiment, at least one surface of the measurement substrate W' is coated with a material having higher infrared emissivity than silicon, and the measurement substrate W' is placed on the electrostatic chuck 6 such that the coated surface faces toward the IR camera 51. Accordingly, the IR camera 51 can efficiently receive infrared light emitted from the measurement substrate W'.

[Hardware]

Figure 22:
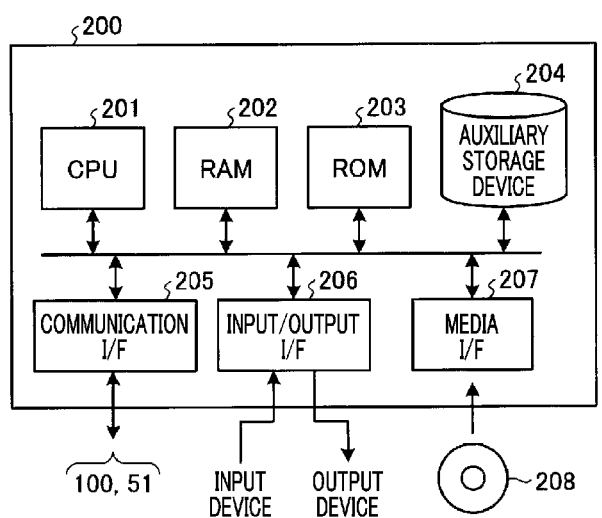
FIG. 22 is a view illustrating an example of a configuration of hardware in the control device.

The control device 200 in each of the above-described exemplary embodiments is implemented by, e.g., a hardware configured as illustrated in FIG. 22. FIG. 22 is a view illustrating an example of a configuration of a hardware in the control device 200. The control device 200 includes a central processing unit (CPU) 201, a random access memory (RAM) 202, a read only memory (ROM) 203, and an auxiliary storage device 204. The control device 200 also includes a communication interface (I/F) 205, an input/output interface (I/F) 206, and a media interface (I/F) 207.

The CPU 201 operates based on a program read from the ROM 203 or the auxiliary storage device 204 and loaded on the RAM 202 to control each unit. The ROM 203 stores, e.g., a boot program executed by the CPU 201 when the control device 200 is started and a program dependent on the hardware of the control device 200.

The auxiliary storage device 204 is, e.g., a hard disk drive (HDD) or a solid state drive (SSD), and stores, e.g., a program executed by the CPU 201 and data used by the program. The CPU 201 reads the program from the auxiliary storage device 204, loads the read program on the RAM 202, and executes the loaded program.

The communication I/F 205 communicates with the processing apparatus 100 and the IR camera 51 through a communication line such as a local area network (LAN). The communication I/F 205 receives data from the processing apparatus 100 and the IR camera 51 through the communication line and sends the data to the CPU 201, and transmits the data generated by the CPU 201 to the processing apparatus 100 and the IR camera 51 through the communication line.

The CPU 201 controls an input device such as a keyboard, and an output device such as a display through the input/output I/F 206. The CPU 201 acquires signals input from the input device through the input/output I/F 206 and sends the acquired signals to the CPU 201. Further, the CPU 201 outputs the generated data to the output device through the input/output I/F 206.

The media I/F 207 reads a program or data stored in a recording medium 208, and stores the read program or data in the auxiliary storage device 204. The recording medium 208 is, e.g., an optical recording medium such as a digital versatile disc (DVD) or a phase change rewritable disk (PD), a magneto-optical recording medium such as a magneto-optical (MO) disk, a tape medium, a magnetic recording medium, or a semiconductor memory.

The CPU 201 executes the program loaded on the RAM 202 to implement respective functions of the power supply 20, the measuring unit 24, and the controller 25. The auxiliary storage device 204 stores the data within the storing unit 26.

The CPU 201 reads the program to be loaded on the RAM 202, from the recording medium 208 and stores the read program in the auxiliary storage device 204. In another example, the CPU 201 may acquire the program from another device through a communication line and store the acquired program in the auxiliary storage device 204.

[Others]

The technology disclosed herein is not limited to the above-described exemplary embodiments, and various modifications may be made within the scope of the gist thereof.

For example, in the above-described exemplary embodiments, each zone 60 is divided into the multiple division zones 61, and the average $IR_A$ of the IR values is calibrated for each division zone 61. However, the technology of the present disclosure is not limited thereto. For example, the $IR_A$ may be calibrated for each zone 60.

Further, in the above-described exemplary embodiments, one temperature sensor 7 or 70 is provided in each area. However, the technology of the present disclosure is not limited thereto. In another example, two or more temperature sensors 7 or 70 may be provided in each area or one temperature sensor 7 or 70 may be provided in multiple areas.

In the above-described first exemplary embodiment, the fluorescent optical fiber thermometer has been described as the temperature sensor 7. However, the technology of the present disclosure is not limited thereto. The temperature sensor 7 may be any sensor, e.g., a thermocouple, other than the fluorescent optical fiber thermometer as long as the sensor can measure the temperature.

Furthermore, in the above-described exemplary embodiments, the plasma etching apparatus has been described as an example of the apparatus that performs the processing onto the substrate W. However, the technology of the present disclosure is not limited thereto. The technology of the present disclosure can be applied to, e.g., a film forming apparatus, a modifying apparatus, or a cleaning apparatus as long as the apparatus includes a mechanism for controlling the temperature of the substrate W with the heater 6c during the processing onto the substrate W.

Further, in the above-described exemplary embodiments, the capacitively coupled plasma (CCP) is used as the plasma source. However, the technology of the present disclosure is not limited thereto. For example, inductively coupled plasma (ICP), microwave-excited surface wave plasma (SWP), electron cyclotron resonance plasma (ECP), or helicon wave-excited plasma (HWP) may be used as the plasma source.

According to the exemplary embodiments, the temperature measurement accuracy of the IR camera can be improved.

From the foregoing, it will be appreciated that various embodiments of the present disclosure have been described herein for the purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A calibration method of an infrared camera, comprising:
    setting a placing table on which a substrate is placed to different temperatures and acquiring a measurement value of radiation amount of infrared light emitted from each of multiple zones provided in a top surface of the placing table by an infrared camera at each of the temperatures;
    calculating, as a calibration value, a difference between a measurement value of a reference zone which is one of the zones provided with a temperature sensor and a measurement value of another one of the zones at each of the temperatures;
    specifying an interpolation curve indicating a variation tendency of the calibration value with respect to the measurement value of the reference zone for each of the zones; and
    storing parameters of the interpolation curve specified for each of the zones.

2. The calibration method of the infrared camera of claim 1,
    wherein the infrared camera is configured to output the measurement value for each of multiple pixels, and
    the measurement value of each of the zones is an average of the measurement values for the multiple pixels when the corresponding zone is imaged by the infrared camera.

3. The calibration method of the infrared camera of claim 2,
    wherein multiple protrusions are formed on a surface of the placing table where the substrate is placed.

4. The calibration method of the infrared camera of claim 3,
    wherein a flow path through which a heat transfer medium whose temperature is controlled flows is formed within the placing table, and
    in the acquiring of the measurement value, the temperature of the placing table is set by controlling the temperature of the heat transfer medium flowing through the flow path.

5. The calibration method of the infrared camera of claim 1,
    wherein multiple protrusions are formed on a surface of the placing table where the substrate is placed.

6. The calibration method of the infrared camera of claim 1,
wherein a flow path through which a heat transfer medium whose temperature is controlled flows is formed within the placing table, and
in the acquiring of the measurement value, the temperature of the placing table is set by controlling the temperature of the heat transfer medium flowing through the flow path.

7. A calibration system of an infrared camera, comprising:
a chamber;
a placing table, provided within the chamber, on which a substrate is placed;
a temperature sensor configured to measure a temperature of a part of the placing table;
an infrared camera configured to measure an amount of infrared light emitted from a top surface of the placing table; and
a control device,
wherein the control device performs:
setting the placing table to different temperatures and acquiring a measurement value of radiation amount of the infrared light emitted from each of multiple zones provided in the top surface of the placing table by the infrared camera at each of the temperatures;
calculating, as a calibration value, a difference between a measurement value of a reference zone which is one of the zones provided with the temperature sensor and a measurement value of another one of the zones at each of the temperatures;
specifying an interpolation curve indicating a variation tendency of the calibration value with respect to the measurement value of the reference zone for each of the zones; and
storing parameters of the interpolation curve specified for each of the zones.

8. A calibration method of an infrared camera, comprising:
setting a placing table on which a substrate is placed to different temperatures and acquiring a measurement value of radiation amount of infrared light emitted from each of multiple zones provided in a top surface of the substrate placed on the placing table by an infrared camera at each of the temperatures;
calculating, as a calibration value, a difference between a measurement value of a reference zone which is one of the zones corresponding to a position of a temperature sensor provided in the substrate and a measurement value of another one of the zones at each of the temperatures;
specifying an interpolation curve indicating a variation tendency of the calibration value with respect to the measurement value of the reference zone for each of the zones; and
storing parameters of the interpolation curve specified for each of the zones.

9. A calibration system of an infrared camera, comprising:
a chamber;
a placing table, provided within the chamber, on which a substrate is placed;
a temperature sensor provided in the substrate and configured to measure a temperature of the substrate;
an infrared camera configured to measure an amount of infrared light emitted from a top surface of the substrate placed on the placing table; and
a control device,
wherein the control device performs:
setting the placing table to different temperatures and acquiring a measurement value of radiation amount of the infrared light emitted from each of multiple zones provided in the top surface of the substrate placed on the placing table by the infrared camera at each of the temperatures;
calculating, as a calibration value, a difference between a measurement value of a reference zone which is one of the zones corresponding to a position of the temperature sensor and a measurement value of another one of the zones at each of the temperatures;
specifying an interpolation curve indicating a variation tendency of the calibration value with respect to the measurement value of the reference zone for each of the zones; and
storing parameters of the interpolation curve specified for each of the zones.

10. The calibration system of the infrared camera of claim 9,
wherein at least one surface of the substrate is coated with a material having higher infrared emissivity than silicon, and the substrate is placed on the placing table such that the coated surface faces toward the infrared camera.

* * * * *